US008817908B2

(12) United States Patent
Lusted (10) Patent No.: US 8,817,908 B2
(45) Date of Patent: Aug. 26, 2014

(54) GENERATING AND/OR RECEIVING, AT LEAST IN PART, SIGNAL THAT INCLUDES AT LEAST ONE WAVEFORM

(75) Inventor: Kent C. Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/447,774

(22) Filed: Apr. 16, 2012

(65) Prior Publication Data

US 2013/0272449 A1 Oct. 17, 2013

(51) Int. Cl.
 *H04L 27/00* (2006.01)
(52) U.S. Cl.
 USPC ............. 375/295; 375/268; 375/302; 341/58; 341/69
(58) Field of Classification Search
 USPC .................. 375/226, 268, 287, 295, 302, 353
 See application file for complete search history.

(56) References Cited

U.S. PATENT DOCUMENTS

| 6,995,694 B1* | 2/2006 | He et al. .......................... 341/58 |
| 2003/0164782 A1* | 9/2003 | Stickle ............................ 341/69 |
| 2005/0018336 A1* | 1/2005 | Kirby ............................... 360/29 |
| 2005/0180520 A1 | 8/2005 | Kim et al. |
| 2005/0259772 A1 | 11/2005 | Voutilainen |
| 2006/0261840 A1* | 11/2006 | Hoon et al. .................... 324/769 |
| 2008/0056403 A1 | 3/2008 | Wilson |
| 2010/0135430 A1 | 6/2010 | Oh et al. |
| 2011/0316726 A1 | 12/2011 | Hollis |
| 2013/0101064 A1* | 4/2013 | Sorrells et al. ................ 375/295 |

OTHER PUBLICATIONS

Bliss, et al., "A Preliminary Proposal for PAM-4TX Specification", for IEEE 802.3100Gbps over backplane and copper cable task force, Sep. 12, 2011, 7 pages.
Bliss, "A Proposal for TX Specification w/ PAM-4", for IEEE 802.3 100Gbps over backplane and copper cable study group, Sep. 2011, 16 Pages.
Brown, et al., "100G backplane PAM4 PHY encoding (revised)", IEEE P802.3bj, Mar. 2012, 36 pages.
Brown, et al., "Amendment and Supplement to brown_01_0312", IEEE P802.3bj, Mar. 2012, 20 Pages.
Chalupsky, David, "Unapproved Minutes", IEEE P802.3bj 100 Gb/s Backplane and Copper Cable Task Force, Plenary Meeting, Mar. 13-14, 2012, 11 pages.
IEEE, "Physical layer specification for 1000 Mb/s operation on four pairs of Category 5 or better balanced twisted pair cable (1000BASE-T)", IEEE Draft P802.3ab/D4.0, Jul. 17, 1998, 153 Pages.
Lusted, Kent C. Emails. Aug. 29, 2011, 2 pages.
Parthasarathy, Vasudevan. Emails. Aug. 16, 2011, 2 pages.
International Search Report and Written Opinion received for Patent Application No. PCT/US2013/036692, mailed on Aug. 23, 2013, 9 pages.

* cited by examiner

*Primary Examiner* — Leon-Viet Nguyen
(74) *Attorney, Agent, or Firm* — Christopher K. Gagne (57) ABSTRACT

An embodiment may include circuitry to generate and/or receive, at least in part, a signal that may include at least one waveform. The at least one waveform may include at least one portion followed by at least one other portion. The at least one portion may include a plurality of levels to be compared to data encoding levels to determine whether the plurality of levels satisfy ratios determined based at least in part upon the plurality of levels and the data encoding levels. The at least one other portion may include maximum and minimum data encoding levels to facilitate emphasis measurement. Many alternatives, variations, and modifications are possible.

16 Claims, 3 Drawing Sheets

GENERATING AND/OR RECEIVING, AT LEAST IN PART, SIGNAL THAT INCLUDES AT LEAST ONE WAVEFORM

FIELD

This disclosure relates to generating, at least in part, and/or receiving, at least in part, a signal that includes one or more waveforms.

BACKGROUND

In a conventional backplane communication arrangement, in order to determine whether a backplane interconnect link is capable of communicating in compliance with a communication protocol, multiple separate predetermined test signals are transmitted, via the link, from a sender to a receiver. As transmitted by the sender, the signals include certain respective features that can change during transmission via the link, depending upon the characteristics of the link. For example, each of the test signals is intended to test whether the link is capable of supporting communication parameters associated with the protocol. The receiver compares the signals that it actually receives to the predetermined signals to determine whether the actually received signals differ from the predetermined signals in ways that depart from and/or preclude communication via the link in compliance with the protocol.

As will be appreciated, the transmitting, receiving, and comparing of multiple separate test signals lengthen the testing process, and involve significant signal generation and processing overhead. Additionally, at least certain conventional test signals typically do not include features that permit determination of whether the link is capable of supporting communication in accordance with certain communication protocol parameters, such as, maximum signal dispersion parameters.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
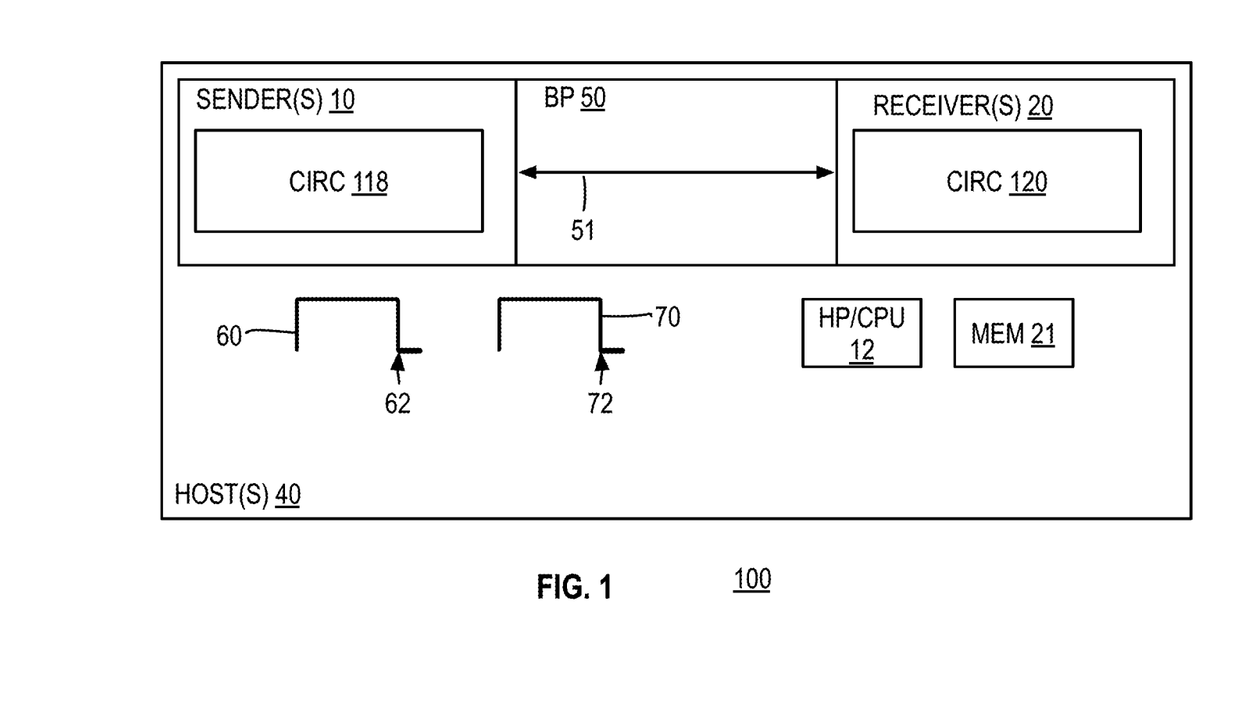
FIG. 1 illustrates a system embodiment.

FIG. 1 illustrates a system embodiment 100. System 100 may include one or hosts 40. One or more hosts 40 may comprise one or more senders (e.g., of one or more signals 62) 10 that may be communicatively coupled, via one or more backplane (BP) communication interconnect links 51 comprised at least in part in one or more backplanes 50, to one or more receivers 20. In this embodiment, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

Sender 10 may comprise circuitry 118. Receiver 20 may comprise circuitry 120. In this embodiment, circuitry 118 and 120 may have respective constructions that may be similar or identical, at least in part. Also in this embodiment, circuitry 118 and 120 may be capable of performing similar, identical, or analogous operations, at least in part. One or more hosts 40 may comprise one or more multi-core host processors (HP) 12 and/or computer-readable/writable memory 21 that may be communicatively coupled, at least in part, via one or more not shown backplane interconnects comprised at least in part in backplane 50, to one or more senders 10, one or more receivers 20, one or more not shown network interface controllers, and/or one or more not shown one or more chipsets (comprising, e.g., memory, network, and/or input/output controller circuitry). These not shown controllers and/or chipsets also may be comprised in host 40. HP 12 may be capable of accessing and/or communicating with, for example, one or more other components of host 40, such as, one or more senders 10, one or more receivers 20, memory 21, circuitry 118, circuitry 120, the one or more not shown controllers and/or the one or more not shown chipsets.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, central processing unit (CPU), processor core (PC), core, and controller each may comprise respective circuitry capable of performing, at least in part, one or more arithmetic and/or logical operations, and/or of executing, at least in part, one or more instructions. Although not shown in the Figures, host 40 may comprise a graphical user interface system that may comprise, e.g., a keyboard, pointing device, and/or display system that may permit one or more human users to input commands to, and monitor the operation of, host 40, system 100, and/or one or more components thereof.

In this embodiment, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. One or more machine-readable program instructions may be stored, at least in part, in memory 21. In operation of host 40, these instructions may be accessed and executed by one or more host processors 12, one or more senders 10, one or more receivers 20, circuitry 118, and/or circuitry 120. When executed by one or more host processors 12, one or more senders 10, one or more receivers 20, circuitry 118, and/or circuitry 120, these one or more instructions may result, at least in part, in one or more host processors 12, one or more senders 10, one or more receivers 20, circuitry 118, and/or circuitry 120 (and/or one or more components thereof) performing the operations that are described herein as being performed by one or more host processors 12, one or more senders 10, one or more receivers 20, circuitry 118, and/or circuitry 120 (and/or one or more components thereof).

In this embodiment, without departing from this embodiment, one or more senders 10, one or more receivers 20, circuitry 118, and/or circuitry 120 may be distinct from the one or more host processors 12, the one or more not shown chipsets, and/or one or more network interface controllers. Alternatively or additionally, one or more senders 10, one or more receivers 20, circuitry 118, and/or circuitry 120 may be comprised, at least in part, in the one or more host processors 12, the one or more not shown chipsets, and/or one or more network interface controllers.

In this embodiment, a portion or subset of an entity may comprise all or less than all of the entity. In this embodiment, a backplane may be or comprise, at least in part, one or more interconnects and/or communication links. In this embodiment, an interconnect or communication link may be or comprise any mechanism, instrumentality, modality, and/or portion thereof that may permit, facilitate, and/or allow, at least in part, two or more entities of and/or in a host to be communicatively coupled together. In this embodiment, first entity may be "communicatively coupled" to a second entity if the first entity is capable of transmitting to and/or receiving from the second entity one or more commands, signals, and/or data.

In this embodiment, one or more senders 10 and/or circuitry 118 may exchange data, commands, and/or signals with one or more receivers 20 and/or circuitry 120 via one or links 51 in accordance with, at least in part, one or more communication protocols. For example, one or more Ethernet protocols that may be utilized in system 100 may comply or be compatible with, at least in part, Institute of Electrical and Electronics Engineers, Inc. (IEEE) Std. 802.3-2008, Dec. 26, 2008. For example, such Ethernet protocol may be modified and/or adapted, at least in part, for use in communicating via backplane and/or backplane interconnect. Many different, additional, and/or other protocols (including, for example, those related to those stated above) may be used for such data, signal, and/or command exchange without departing from this embodiment (e.g., earlier and/or later-developed versions of the aforesaid, related, and/or other protocols).

In accordance with the one or more protocols that may be employed, in this embodiment, for such data, command, and/or signal exchange via one or more links 51, data may be encoded based, at least in part, upon multiple data encoding levels. For example, depending upon the particular protocol used in this embodiment, one or more signals that may be communicated via backplane 50 and/or one or more links 51 may comprise one or more of a plurality of possible voltage levels (e.g., as set forth in, and/or in accordance with the communication protocol employed), and by appropriately selecting these one or more levels and/or maintaining the one or more selected levels for one or more appropriate time periods, particular data and/or command values may be encoded in and/or by the one or more signals, in accordance with such protocol.

By way of non-limiting example, in this embodiment, in accordance with such protocol, these possible voltage levels may be or comprise four voltage levels: −1 V, −0.4 V, 0.4 V, and 1 V. By appropriately selecting and/or maintaining for appropriate time periods pulses of these voltage levels, a signal transmitted from sender 10 to receiver 20 may encode one or more commands and/or data to be received by receiver 20 from sender 10. Accordingly, for example, if the signal as received by the receiver 20 does not comprise the selected levels and/or selected level durations (e.g., as embodied in the signal as transmitted by the sender 10) and/or such levels and/or durations cannot be reliably detected and/or determined by the receiver 20, reliable communication in accordance with such protocol between the sender 10 and receiver 20 via one or more links 51 may be made more difficult and/or may not be practicable. Of course, the number of data encoding levels, the respective voltage levels of the data encoding levels, the manner in which such encoding levels are used to encode data, and/or other parameters may vary without departing from this embodiment.

In this embodiment, in order to test and/or verify, at least in part, whether such reliable communication may be made difficult and/or impracticable, circuitry 118 and/or one or more senders 10 may generate, at least in part, a predetermined test signal 62, and may transmit, at least in part, the predetermined test signal 62 to one or more receivers 20 via one or more interconnect links 51 and/or backplane 50. After and/or as a result, at least in part, of propagating through one or more links 51 and/or backplane 50, one or more characteristics of signal 62 may have been modified, at least in part, so as to be or comprise resultant signal 72 that may be received, at least in part, by circuitry 120 and/or one or more receivers 20. As is discussed below, circuitry 120 and/or one or more receivers 20 may compare one or more characteristics and/or features of signal 72 to one or more corresponding characteristics and/or features of signal 62 to determine, at least in part, whether such reliable communication may be made difficult or impracticable. Depending upon the results of such comparison, sender 10, circuitry 118, receiver 20, and/or circuitry 120 may initiate, for example, further actions (e.g., further communication negotiations) so as to facilitate and/or enable communications that may be in accordance with the capabilities and/or limitations determined by such comparison.

For example, as generated and/or transmitted by circuitry 118 and/or sender 10, signal 62 may include one or more waveforms 60. As received by circuitry 120 and/or receiver 20, signal 72 may include one or more waveforms 70. Depending upon the particular characteristics of one or more links 52 and/or backplane 50, one or more waveforms 70 may differ, at least in part, from one or more waveforms 60. One or more differences (or lack thereof) between one or more waveforms 70 and one or more waveforms 60 may permit circuitry 120 and/or one or more receivers 20 to determine, at least in part, whether such reliable communication may be difficult and/or impractical, and/or such further actions (if any) to undertake.

In this embodiment, a signal may be or comprise one or more electro-magnetic, thermal, and/or optical phenomena. In this embodiment, a waveform may be or comprise, at least in part, one or more portions, features, characteristics, and/or attributes of a signal.

Figure 2:
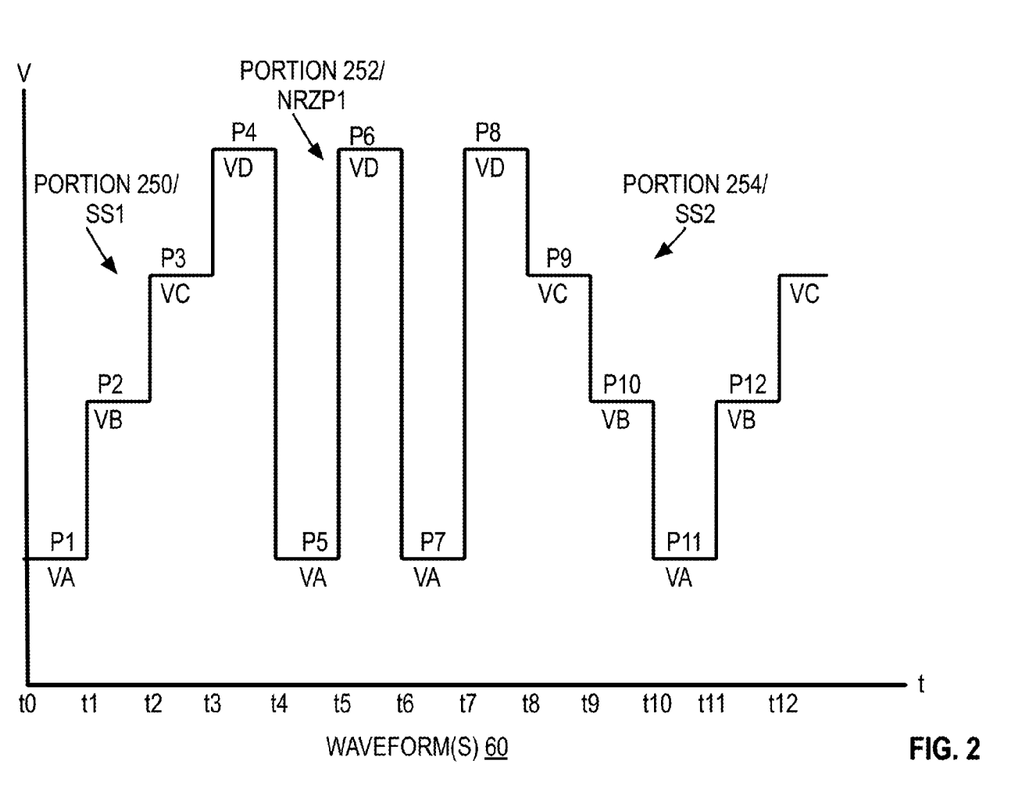
FIG. 2 illustrates features in an embodiment.
Figure 3:
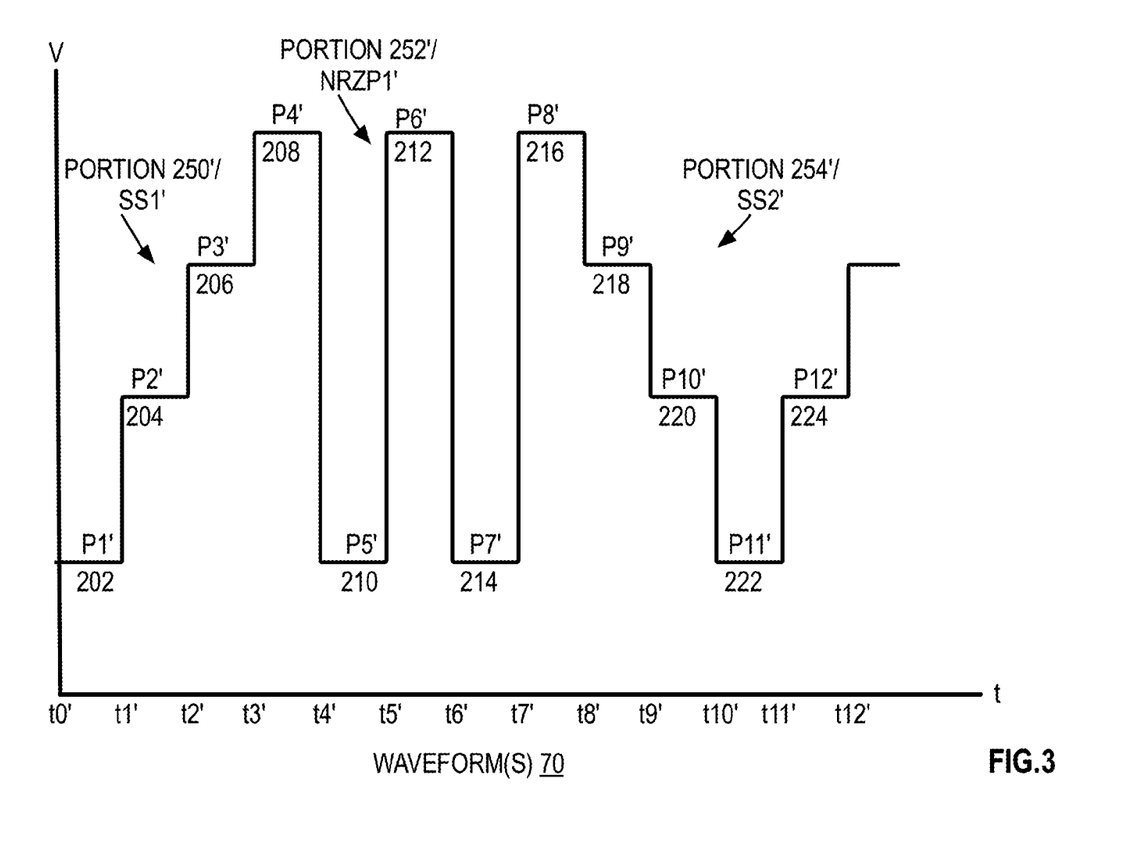
FIG. 3 illustrates features in an embodiment.

For example, FIG. 2 illustrates one or more waveforms 60 in an embodiment. FIG. 3 illustrates one or more waveforms 70. In FIG. 3, the respective characteristics and/or elements of one or more waveforms 70 that may correspond, at least in part, to respective counterpart characteristics and/or elements of one or more waveforms 60 in FIG. 2 have been given the same reference labels but with "primed" designations (e.g., pulse P1′ in the one or more waveforms 70 in FIG. 3 corresponds to the pulse P1 in the one or more waveforms 60 in FIG. 2.

In this embodiment, one or more waveforms 60 may include one or more portions (e.g., one or more portions 250) that may be followed by one or more other portions (e.g., one or more portions 252), which, in turn, may be followed by one or more additional portions (e.g., one or more portions 254). One or more portions 250 may include a plurality of respective levels VA, VB, VC, VD that are to be compared (e.g., by circuitry 120 and/or receiver 20) to corresponding data encoding levels (e.g., the four respective possible voltage levels used for data encoding in accordance with the communication protocol that is to be used) to determine whether the plurality of levels VA, VB, VC, VD in one or more portions 250 (or, stated more properly, their corresponding levels 202, 204, 206, 208 in one or more waveforms 70 as received by circuitry 120 and/or receiver 20) may at least satisfy (e.g., be greater than or equal to) corresponding minimum threshold ratios (e.g., minimum acceptable, desirable, and/or permissible amplitude ratios for permitting reliable communication) when divided by their respective corresponding data encoding levels VA, VB, VC, VD.

The one or more portions 252 may include maximum (e.g., VD) and minimum (e.g., VA) data encoding levels to facilitate emphasis measurement. In this embodiment, emphasis measurement may be, comprise, involve, facilitate, and/or relate to, at least in part, measurement of and/or measurement for the purpose of determining, compensating and/or correcting for, at least in part, signal dispersion (e.g., chromatic and/or component frequency dispersion). In this embodiment, such emphasis measurement may be based, at least in part, upon comparing the respective characteristics and/or features (e.g., amplitudes, relative timings, pulse shapes, etc.) of pulses P5', P6', and P7' of waveform 70 to the respective corresponding characteristics and/or features of corresponding pulses P5, P6, and P7 of waveform 60 (which as stated previously may be predetermined, and therefore, may be preprogrammed and available a priori to circuitry 120 and/or receiver 20). Based at least in part upon such comparison, circuitry 120 and/or receiver 20 may determine relevant signal dispersion characteristics that may facilitate such emphasis measurement.

In this embodiment, the plurality of levels VA, VB, VC, VD in the one or more portions 250 may be, comprise, and/or embody, at least in part, one or more stair step patterns SS1. Also in this embodiment, one or more portions 252 may be, comprise, and/or embody, at least in part, one or more full amplitude swing, non-return-to-zero (NRZ) patterns NRZP1 that may comprise (at least as transmitted by circuitry 118 and/or sender 10) the maximum encoding level VD and the minimum encoding level VA. One or more portions 254 may comprise one or more other stair step patterns SS2 that may be, comprise, and/or embody, at least in part, one or more reverse stair step patterns from (e.g., relative and/or compared to) the one or stair step patterns SS1.

In this embodiment, a stair step pattern may be, comprise, and/or embody a sequence of ascending and/or descending levels that may (or may not) be contiguous with and/or adjacent to each other. Also in this embodiment, an NRZ pattern may be, comprise, and/or embody at least one level that may correspond, at least in part, to a maximum data encoding level, and at least one other level that may correspond, at least in part, to a minimum data encoding level. In this embodiment, a first stair step pattern may be considered to comprise a reverse stair step pattern of a second stair step pattern, if the first stair step pattern comprises a sequence of two or more ascending levels while the second stair step pattern comprises a sequence of two or more descending levels, or vice versa. Additionally, in this embodiment, a pattern may comprise one or more repeated and/or single instances of one or more features and/or characteristics. Although particular forms of the waveforms 60 and 70 in this embodiment are described herein and illustrated in FIGS. 2 and 3, it should be understood that this is merely exemplary, and the particular number of the portions comprised in these waveforms, as well as, their respective forms, contents, etc. may vary without departing from this embodiment.

For example, as transmitted as one or more waveforms 60, one or more portions 250 may comprise a respective sequence of pulses P1, P2, P3, P4 transmitted at respective times T0, T1, T2, T3 whose respective voltage levels VA, VB, VC, VD may constitute and/or embody the ascending stair step pattern SS1 shown in FIG. 1. Accordingly, the respective voltage levels of pulses P1, P2, P3, P4 may comprise one or more respective occurrences of each of the data encoding levels used in the protocol.

Following one or more portions 250 in one or more waveforms 60 may be one or more portions 252 which may comprise a sequence of pulses P5, P6, P7 transmitted at respective times T4, T5, T6 whose respective voltage levels VA, VD, VA may constitute one or more NRZ patterns. For example, although not shown in the Figures, without departing from this embodiment, one or more portions 252 may be, comprise, and/or embody, at least in part, multiple NRZ patterns.

Following one or more portions 252 in one or more waveforms 60 may be one or more portions 254. One or more portions 254 may comprise a sequence of pulses P8, P9, P10 transmitted at respective times T7, T8, T9 whose respective voltage levels VD, VC, VB may constitute and/or embody one or more descending stair step patterns SS2. One or more descending stair step patterns SS2 may be or comprise one or more complete and/or partial reverse stair step patterns compared and/or relative to one or more stair step patterns SS1. These one or more stair step patterns SS2 may be used to determine whether the plurality of levels VD, VC, VB, (or, stated more properly, their respective corresponding levels 216, 218, 220 in one or more waveforms 70 as received by circuitry 120 and/or receiver 20) may at least satisfy (e.g., be greater than or equal to) corresponding minimum threshold ratios (e.g., minimum acceptable, desirable, and/or permissible amplitude ratios for permitting reliable communication) when divided by their respective corresponding data encoding levels VD, VC, VB.

In this embodiment, each of the pulses P1 to P10 may have a respective pulse width (e.g., time duration) that may be identical (e.g., 8 baud periods). Accordingly, each of the respective levels embodied and/or comprised in such pulses P1 to P10 may be maintained for (e.g., have a time duration of) 8 respective baud periods. Thus, each and every one of these pulses P1 to P10 may be or comprise a respective pulse amplitude modulation level (e.g., a respective one of the encoding levels VA, VB, VC, or VD, as the case may be). Additionally or alternatively, however, one or more of the pulses P1 to P10 may have a respective pulse width that may differ from this and/or from the respective pulse widths of the other pulses. For example, two or more adjacent pulses (e.g., P1 and P2, P5 and P6, and/or P8 and P9) of the respective pulses (and their respective levels) in portions 250, 252, and/or 254 may be different from each other. For example, the multiple NRZ patterns may be comprised in one or more portions 252 may have pulse widths and/or number of pulses that may be different, at least in part, from each other (e.g., may differ as between or among the respective pulses that may comprise and/or embody the NRZ patterns). Many variations are possible without departing from this embodiment.

In this embodiment, one or more waveforms 60 may be periodic (e.g., repeating in a plurality of cycles) with a period of 80 baud periods. Thus, after pulse P10, one or more waveforms 60 may recommence with a new cycle in which each and every one of the pulses P1 to P10 may be repeated in sequence. Thus, for example, pulses P11 and P12 may correspond, in this new cycle, to pulses P1 and P2, respectively, in the earlier cycle.

As stated previously, as a result at least in part of propagating through backplane 50 and/or one or more links 52, one or more waveforms 60 may be modified, at least in part, so as to result in one or more resultant waveforms 70 that may be received by circuitry 120 and/or one or more receivers 20. Circuitry 120 and/or one or more receivers 20 may measure the aforesaid and/or other characteristics and/or features of each of the pulses P1' to P10' of the one or more received waveforms 70 (e.g., after one or more respective signal settling periods of between 3 and 7 baud periods have elapsed for each of the respective pulses P1' to P10'). Circuitry 120 and/or receiver 20 may compare (e.g., in the manner described above) these characteristics and/or features of the one or more received waveforms 70 to their respective corresponding counterpart characteristics and/or features in one or more predetermined waveforms 60. Based at least in part upon such comparison, circuitry 120 and/or receiver 20 may determine whether reliable communication via one or more links 52 may be difficult and/or impracticable.

Thus, an embodiment may include circuitry to generate and/or receive, at least in part, a signal that may include at least one waveform. The at least one waveform may include at least one portion followed by at least one other portion. The at least one portion may include a plurality of levels to be compared to data encoding levels to determine whether the plurality of levels satisfy ratios determined based at least in part upon the plurality of levels and the data encoding levels. The at least one other portion may include maximum and minimum data encoding levels to facilitate emphasis measurement.

Advantageously, in this embodiment, a single test signal may be employed that may be permit determination of whether a backplane or backplane communication link may be capable of being used for reliable communication. Advantageously, this may reduce the amount of time and processing overhead involved in receiving, comparing, and/or processing such a test signal in this embodiment. Further advantageously, in this embodiment, the single test signal may be employed to determine whether the backplane and/or backplane link may be capable of supporting communication in accordance with certain communication protocol parameters, such as, maximum signal dispersion parameters.

Many modifications are possible. For example, although the pulses that may comprise the waveforms 60 and/or 70 may be, comprise, and/or embody one or more respective square or rectangular waves and/or pulses, other types of waveforms and/or pulses may be employed without departing from this embodiment. Also, for example, although one or more embodiments have been described as being employed in connection with backplane and/or backplane interconnection technologies, uses, applications, and/or environments, one or more embodiments may be employed in connection with other technologies, uses, applications, and/or environments, including, e.g., in connection with networking, internetworking, and/or other communication-related technologies, uses, applications, and/or environments. Additionally or alternatively, for example, one or more embodiments may be employed to advantage in connection with testing to determine compliance with one or more communication protocols. After such compliance testing has been performed, results of such compliance testing may be utilized, for example, in accordance with and/or by one or more communication training algorithms that may adjust and/or modify, at least in part, one or more parameters of communication (e.g., in order to permit communication to be carried out at maximum speed and/or to the maximum capabilities of the communication link, in accordance with the one or more communication protocols). These one or more parameters may comprise, for example, one or more communication signal amplitudes, tones and/or frequencies of communications, multi-tonal encoding techniques and/or mappings, etc. Such parameters may be programmed into the one or more senders and/or receivers, after such compliance testing has been performed. Such parameters may be communicated, for example, during and/or as a result of, communication protocol negotiation and/or exchange between the one or more senders and/or receivers, e.g., prior to exchange of other and/or additional commands and/or data between the one or more senders and/or receivers. Accordingly, this embodiment should be viewed broadly as encompassing all such alternatives, modifications, and alternatives.

What is claimed is:

1. An apparatus comprising:
circuitry to generate, at least in part, at a sender, a signal that includes at least one waveform, the at least one waveform including at least one sequence of ten voltage levels, each of the ten voltage levels being selected from a group of differing voltage levels consisting of a VA voltage level, a VB voltage level, a VC voltage level, and a VD voltage level, the at least one sequence of the ten voltage levels comprising:
a first VA voltage level followed by a first VB voltage level followed by a first VC voltage level followed by a first VD voltage level followed by a second VA voltage level followed by a second VD voltage level followed by a third VA voltage level followed by a third VD voltage level followed by a second VC voltage level followed by a second VB voltage level;
wherein:
one or more characteristics of the at least one waveform are to be measured, after one or more respective periods have elapsed;
the at least one waveform is to be transmitted from the sender to a receiver via a backplane;
the receiver is to compare, after one or more respective settling periods have elapsed, the one or more characteristics of the at least one waveform, as received by the receiver, to one or more corresponding characteristics of at least one predetermined waveform;
each of the ten levels comprised in the at least one waveform is to be measured by the receiver after a respective settling period; and
the receiver is to compare the one or more characteristics of the at least one waveform, as received by the receiver, to the one or more corresponding characteristics of the at least one predetermined waveform for testing in accordance with one or more communication protocols.

2. The apparatus of claim 1, wherein:
each of the first, the second, and the third VA voltage levels comprises a respective −1 volt level;
each of the first, the second, and the third VD voltage levels comprises a respective 1 volt level; and
each of the first and the second VB voltage levels is both:
greater than each of the first, the second, and the third VA voltage levels; and
less than each of the first, the second, and the third VD voltage levels.

3. The apparatus of claim 1, wherein:
results of the testing are utilized to adjust one or more communication parameters to facilitate communication in accordance with the one or more communication protocols.

4. An apparatus comprising:
circuitry to generate, at least in part, at a sender, a signal that includes at least one waveform, the at least one waveform including at least one sequence of ten voltage levels, each of the ten voltage levels being selected from a group of differing voltage levels consisting of a VA voltage level, a VB voltage level, a VC voltage level, and a VD voltage level, the at least one sequence of the ten voltage levels comprising:
a first VA voltage level followed by a first VB voltage level followed by a first VC voltage level followed by a first VD voltage level followed by a second VA voltage level followed by a second VD voltage level followed by a third VA voltage level followed by a third VD voltage level followed by a second VC voltage level followed by a second VB voltage level:
wherein:
one or more characteristics of the at least one waveform are to be measured, after one or more respective periods have elapsed;
the at least one sequence of the ten plurality of levels comprises:
at least one ascending stair step pattern;
at least one descending stair step pattern; and
at least one full amplitude swing pattern in between the at least one ascending stair step pattern and the at least one descending stair step pattern;
the at least one full amplitude swing pattern comprises maximum and minimum voltage levels of the at least one waveform;
each respective voltage level in the at least one sequence of the ten voltage levels has an identical respective duration;
each respective VA voltage level is less than each respective VB voltage level;
each respective VB voltage level is less than each respective VC voltage level; and
each respective VC voltage level is less than each respective VD voltage level.

5. An apparatus comprising:
circuitry to receive, at least in part, at a receiver, a signal that includes at least one waveform, the at least one waveform including at least one sequence of ten voltage levels, each of the ten voltage levels being selected from a group of differing voltage levels consisting of a VA voltage level, a VB voltage level, a VC voltage level, and a VD voltage level, the at least one sequence of the ten voltage levels comprising:
a first VA voltage level followed by a first VB voltage level followed by a first VC voltage level followed by a first VD voltage level followed by a second VA voltage level followed by a second VD voltage level followed by a third VA voltage level followed by a third VD voltage level followed by a second VC voltage level followed by a second VB voltage level;
wherein:
one or more characteristics of the at least one waveform are to be measured, after one or more respective periods have elapsed;
the at least one sequence of the ten plurality of levels comprises:
at least one ascending stair step pattern;
at least one descending stair step pattern; and
at least one full amplitude swing pattern that is in between the at least one ascending stair step pattern and the at least one descending stair step pattern;
the at least one full amplitude swing pattern comprises maximum and minimum voltage levels of the at least one waveform each respective voltage level in the at least one sequence of the ten voltage levels has an identical respective duration;
each respective VA voltage level is less than each respective VB voltage level;
each respective VB voltage level is less than each respective VC voltage level; and
each respective VC voltage level is less than each respective VD voltage level.

6. The apparatus of claim 5, wherein:
each of the first, the second, and the third VA voltage levels comprises a respective −1 volt level; and
each of the first, the second, and the third VD voltage levels comprises a respective 1 volt level.

7. An apparatus comprising:
circuitry to receive, at least in part, at a receiver, a signal that includes at least one waveform, the at least one waveform including at least one sequence of ten voltage levels, each of the ten voltage levels being selected from a group of differing voltage levels consisting of a VA voltage level, a VB voltage level, a VC voltage level, and a VD voltage level, the at least one sequence of the ten voltage levels comprising:
a first VA voltage level followed by a first VB voltage level followed by a first VC voltage level followed by a first VD voltage level followed by a second VA voltage level followed by a second VD voltage level followed by a third VA voltage level followed by a third VD voltage level followed by a second VC voltage level followed by a second VB voltage level;
wherein:
one or more characteristics of the at least one waveform are to be measured, after one or more respective periods have elapsed;
the at least one waveform is to be transmitted from a sender to the receiver via a backplane;
the receiver is to compare, after one or more respective settling periods have elapsed, the one or more characteristics of the at least one waveform, as received by the receiver, to one or more corresponding characteristics of at least one predetermined waveform;
each of the ten levels comprised in the at least one waveform is to be measured by the receiver after a respective settling period; and
the receiver is to compare the one or more characteristics of the at least one waveform, as received by the receiver, to the one or more corresponding characteristics of the at least one predetermined waveform for testing in accordance with one or more communication protocols.

8. The apparatus of claim 7, wherein:
results of the testing are utilized to adjust one or more communication parameters to facilitate communication in accordance with the one or more communication protocols.

9. A method comprising:
generating, at least in part, at a sender, a signal that includes at least one waveform, the at least one waveform including at least one sequence of ten voltage levels, each of the ten voltage levels being selected from a group of differing voltage levels consisting of a VA voltage level, a VB voltage level, a VC voltage level, and a VD voltage level, the at least one sequence of the ten voltage levels comprising:
a first VA voltage level followed by a first VB voltage level followed by a first VC voltage level followed by a first VD voltage level followed by a second VA voltage level followed by a second VD voltage level followed by a third VA voltage level followed by a third VD voltage level followed by a second VC voltage level followed by a second VB voltage level;

wherein:
one or more characteristics of the at least one waveform are to be measured, after one or more respective periods have elapsed;
the at least one sequence of the ten plurality of levels comprises:
at least one ascending stair step pattern;
at least one descending stair step pattern;
at least one full amplitude swing pattern in between the at least one ascending stair step pattern and the at least one descending stair step pattern; and
the at least one full amplitude swing pattern comprises maximum and minimum voltage levels of the at least one waveform;
each respective voltage level in the at least one sequence of the ten voltage levels has an identical respective duration;
each respective VA voltage level is less than each respective VB voltage level;
each respective VB voltage level is less than each respective VC voltage level; and
each respective VC voltage level is less than each respective VD voltage level.

10. The method of claim 9, wherein:
each of the first, the second, and the third VA voltage levels comprises a respective −1 volt level; and
each of the first, the second, and the third VD voltage levels comprises a respective 1 volt level.

11. A method comprising:
generating, at least in part, at a sender, a signal that includes at least one waveform, the at least one waveform including at least one sequence of ten voltage levels, each of the ten voltage levels being selected from a group of differing voltage levels consisting of a VA voltage level, a VB voltage level, a VC voltage level, and a VD voltage level, the at least one sequence of the ten voltage levels comprising:
a first VA voltage level followed by a first VB voltage level followed by a first VC voltage level followed by a first VD voltage level followed by a second VA voltage level followed by a second VD voltage level followed by a third VA voltage level followed by a third VD voltage level followed by a second VC voltage level followed by a second VB voltage level;
wherein:
one or more characteristics of the at least one waveform are to be measured, after one or more respective periods have elapsed;
the at least one waveform is to be transmitted from the sender to a receiver via a backplane;
the receiver is to compare, after one or more respective settling periods have elapsed, the one or more characteristics of the at least one waveform, as received by the receiver, to one or more corresponding characteristics of at least one predetermined waveform;
each of the ten levels comprised in the at least one waveform is to be measured by the receiver after a respective settling period; and
the receiver is to compare the one or more characteristics of the at least one waveform, as received by the receiver, to the one or more corresponding characteristics of the at least one predetermined waveform for testing in accordance with one or more communication protocols.

12. The method of claim 11, wherein:
results of the testing are utilized to adjust one or more communication parameters to facilitate communication in accordance with the one or more communication protocols.

13. A method comprising:
receiving, at least in part, at a receiver, a signal that includes at least one waveform, the at least one waveform including at least one sequence of ten voltage levels, each of the ten voltage levels being selected from a group of differing voltage levels consisting of a VA voltage level, a VB voltage level, a VC voltage level, and a VD voltage level, the at least one sequence of the ten voltage levels comprising:
a first VA voltage level followed by a first VB voltage level followed by a first VC voltage level followed by a first VD voltage level followed by a second VA voltage level followed by a second VD voltage level followed by a third VA voltage level followed by a third VD voltage level followed by a second VC voltage level followed by a second VB voltage level;
wherein:
one or more characteristics of the at least one waveform are to be measured, after one or more respective periods have elapsed;
the at least one sequence of the ten plurality of levels comprises:
at least one ascending stair step pattern;
at least one descending stair step pattern; and
at least one full amplitude swing pattern that is in between the at least one ascending stair step pattern and the at least one descending stair step pattern;
the at least one full amplitude swing pattern comprises maximum and minimum voltage levels of the at least one waveform;
each respective voltage level in the at least one sequence of the ten voltage levels has an identical respective duration;
each respective VA voltage level is less than each respective VB voltage level;
each respective VB voltage level is less than each respective VC voltage level; and
each respective VC voltage level is less than each respective VD voltage level.

14. The method of claim 13, wherein:
each of the first, the second, and the third VA voltage levels comprises a respective −1 volt level; and
each of the first, the second, and the third VD voltage levels comprises a respective 1 volt level.

15. A method comprising:
receiving, at least in part, at a receiver, a signal that includes at least one waveform, the at least one waveform including at least one sequence of ten voltage levels, each of the ten voltage levels being selected from a group of differing voltage levels consisting of a VA voltage level, a VB voltage level, a VC voltage level, and a VD voltage level, the at least one sequence of the ten voltage levels comprising:
a first VA voltage level followed by a first VB voltage level followed by a first VC voltage level followed by a first VD voltage level followed by a second VA voltage level followed by a second VD voltage level followed by a third VA voltage level followed by a third VD voltage level followed by a second VC voltage level followed by a second VB voltage level;

wherein:
one or more characteristics of the at least one waveform are to be measured, after one or more respective periods have elapsed;

the at least one waveform is to be transmitted from a sender to the receiver via a backplane;

the receiver is to compare, after one or more respective settling periods have elapsed, the one or more characteristics of the at least one waveform, as received by the receiver, to one or more corresponding characteristics of at least one predetermined waveform;

each of the ten levels comprised in the at least one waveform is to be measured by the receiver after a respective settling period; and the receiver is to compare the one or more characteristics of the at least one waveform, as received by the receiver, to the one or more corresponding characteristics of the at least one predetermined waveform for testing in accordance with one or more communication protocols.

16. The method of claim 15, wherein:
results of the testing are utilized to adjust one or more communication parameters to facilitate communication in accordance with the one or more communication protocols.

* * * * *

UNITED STATES PATENT AND TRADEMARK OFFICE
CERTIFICATE OF CORRECTION

| | | |
|---|---|---|
| PATENT NO. | : 8,817,908 B2 | Page 1 of 1 |
| APPLICATION NO. | : 13/447774 | |
| DATED | : August 26, 2014 | |
| INVENTOR(S) | : Kent C. Lusted | |

It is certified that error appears in the above-identified patent and that said Letters Patent is hereby corrected as shown below:

In the Claims

In column 9, line 12, in claim 4, delete "level:" and insert -- level; --, therefor.

In column 9, line 67, in claim 5, delete "waveform" and insert -- waveform; --, therefor.

In column 11, line 50, in claim 11, delete "level:" and insert -- level; --, therefor.

Signed and Sealed this
Third Day of February, 2015

Michelle K. Lee
*Deputy Director of the United States Patent and Trademark Office*